US006971461B2

(12) United States Patent
Yamamoto et al.

(10) Patent No.: US 6,971,461 B2
(45) Date of Patent: Dec. 6, 2005

(54) FRONT AND REAR WHEEL DRIVE VEHICLE AND CONTROL DEVICE FOR CONTROLLING SAME

(75) Inventors: Akihiro Yamamoto, Saitama (JP); Naoki Uchiyama, Saitama (JP); Takahiro Yonekura, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 234 days.

(21) Appl. No.: 10/677,477

(22) Filed: Oct. 3, 2003

(65) Prior Publication Data

US 2004/0104059 A1 Jun. 3, 2004

Related U.S. Application Data

(63) Continuation-in-part of application No. 09/973,807, filed on Oct. 11, 2001, now abandoned.

(30) Foreign Application Priority Data

Nov. 13, 2000 (JP) .............................. 2000-344555

(51) Int. Cl.$^7$ ................................................ B60K 1/00
(52) U.S. Cl. ........................................ 180/65.2; 477/3
(58) Field of Search ............................. 180/65.2–65.4; 701/22; 290/40 C; 477/2, 3

(56) References Cited

U.S. PATENT DOCUMENTS

| 6,054,844 | A | 4/2000 | Frank |
| 6,434,469 | B1 | 8/2002 | Shimizu et al. |
| 6,726,593 | B2 * | 4/2004 | Yamamoto et al. ............ 477/5 |
| 2002/0056584 | A1 | 5/2002 | Nakasako et al. |
| 2002/0058565 | A1 | 5/2002 | Yamamoto et al. |
| 2002/0087252 | A1 | 7/2002 | Shimizu et al. |
| 2004/0040758 | A1 * | 3/2004 | Shimizu .................... 180/65.2 |
| 2004/0099459 | A1 * | 5/2004 | Nakasako et al. .......... 180/248 |
| 2005/0065690 | A1 * | 3/2005 | Ashizawa et al. ............ 701/51 |
| 2005/0096830 | A1 * | 5/2005 | Ohta et al. ..................... 701/91 |

FOREIGN PATENT DOCUMENTS

JP 2001-105919 4/2001

* cited by examiner

Primary Examiner—Bryan Fischmann
(74) Attorney, Agent, or Firm—Arent Fox, PLLC.

(57) ABSTRACT

A front and rear wheel drive vehicle having front and rear wheel pairs one of which is driven with an engine and the other of which is driven with an electric motor. The vehicle has a control device including a target drive-power unit which sets a target drive-power responsive to operating conditions of the vehicle and a motor-assist-mode drive-power distribution-ratio setting unit which sets a drive-power distribution-ratio between an engine drive-power and a motor drive-power according to an energy efficiency index value indicating the degree of contribution to fuel consumption based on the target drive-power and a vehicle speed. In addition the vehicle includes an electric-power-generation running-mode drive-power distribution-ratio setting unit which sets a charging-mode distribution ratio, between the engine drive-power and the motor drive-power, responsive to an energy loss index value indicating the degree of contribution to fuel consumption during a charging-mode that is on the basis of the target drive-power and the vehicle speed.

8 Claims, 6 Drawing Sheets

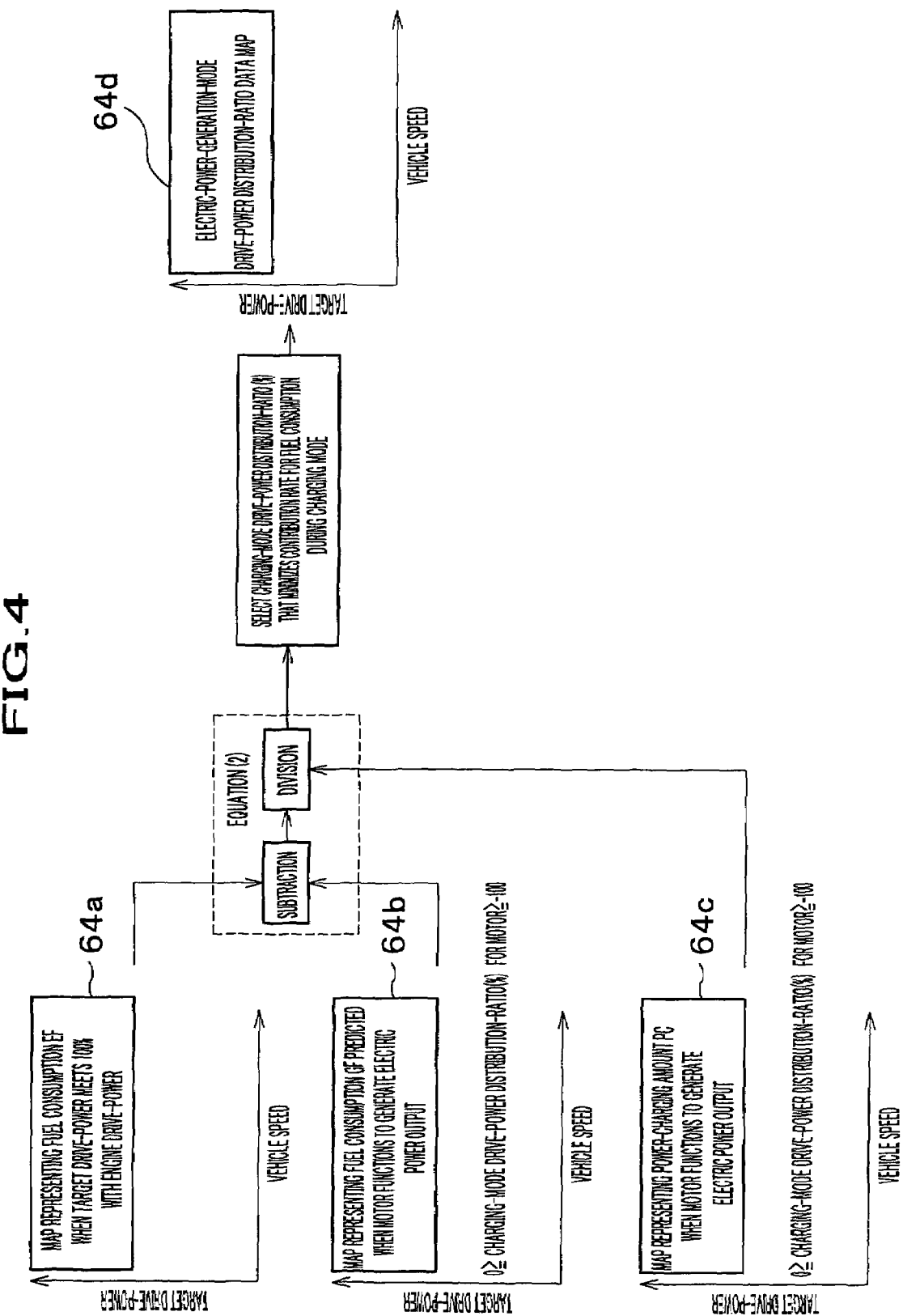

FRONT AND REAR WHEEL DRIVE VEHICLE AND CONTROL DEVICE FOR CONTROLLING SAME

CROSS-REFERENCE TO RELATED APPLICATIONS

This application is a Continuation-In-Part of U.S. patent application Ser. No. 09/973,807 filed Oct. 11, 2001, abandoned.

FIELD OF THE INVENTION

The present invention relates to front and rear wheel drive vehicles and, more particularly, to a front and rear wheel drive vehicle and a control device for the front and rear wheel drive vehicle wherein one of front and rear wheel pairs is driven with an engine and the other one of the front and rear wheel pairs is driven with an electric motor.

BACKGROUND OF THE INVENTION

In recent years, extensive research and development works have been undertaken to provide a front and rear wheel drive vehicle wherein one of front and rear wheel pairs is driven with an engine and the other one of the front and rear wheel pairs is driven with an electric motor. The front and rear wheel drive vehicle is a vehicle which serves as a hybrid vehicle having a low fuel consumption and which serves as a four-wheel drive vehicle having a running stability.

In general, the front and rear wheel drive vehicle includes a battery that stores electric power to be supplied to the electric motor, and an electric power generator that charges the battery. In a case where the electric motor, which drives the wheels, serves as the electric power generator, the electric motor regenerates a portion of the energy of the vehicle as an electrical energy, i.e., a regenerative power which is charged into the battery. Usually, the electric motor functions to produce regenerative power during a decelerating condition of the vehicle wherein an accelerator pedal is not depressed. However, in the event that the amount of power remaining in the battery is below a given level, a forced charging operation is carried out even when the accelerator pedal is depressed. During regenerative operation of the electric motor, also, a brake force is applied to the wheels associated with the electric motor on account of its regenerative operation.

In addition, the front and rear wheel drive vehicle includes a control device which is arranged to set an engine drive-power and a motor drive-power and controls the engine and the electric motor. The control device functions to set a target drive-power necessary for driving the vehicle on the basis of a vehicle speed and an accelerator pedal's opening degrees, etc. Further, the control device selects a drive-power distribution-ratio from a data map, which is preliminarily set, and functions to divide the target drive-power into the engine drive-power and the motor drive-power on the basis of the drive-power distribution-ratio.

SUMMARY OF THE INVENTION

In such a hybrid vehicle, in order to improve fuel consumption, there are many instances where the control device selects a drive-power distribution-ratio effective for minimizing fuel consumption of the engine. When the engine drive-power and the motor drive-power are set on the basis of the drive-power distribution-ratio, fuel consumption of the engine is minimized. However, due to the minimized fuel consumption, there are many instances where the drive-power distribution-ratio specified for the engine is reduced and the motor drive power is increased. In such instances, the amount of electric power to be supplied by the battery and the amount of electric power to be charged into the battery are inevitably increased. As a result, in an event that the drive-power distribution-ratio, that minimizes the fuel consumption of the engine, is selected, there are some instances where a problem is encountered in a decrease in an energy efficiency of the hybrid system composed of the engine and the electric motor. That is, when distributing drive power components for the engine and the electric motor in the hybrid system, if the power distribution is implemented so as to minimize the fuel consumption of the engine, the electric power consumption of the electric motor tends to increase. For this reason, it is required for the battery to be charged to compensate for such electric power consumption and, therefore, the engine drive power should be increased to cause the electric motor to generate electric power output. This results in an increase in the fuel consumption of the engine, degrading an energy efficiency of the hybrid system with a resultant deterioration in the fuel consumption.

It is therefore an object of the present invention to provide a control device for a front and rear wheel drive vehicle for allocating drive power at the most optimum energy efficiency to minimize electric power consumption while providing an improved fuel consumption.

It is another object of the present invention to provide a front and rear wheel drive vehicle for allocating drive power at the most optimum energy efficiency to minimize electric power consumption while providing an improved fuel consumption.

According to a first aspect of the present invention, there is provided a control device for a front and rear wheel drive vehicle having a front wheel pair and a rear wheel pair, one of which is driven with an engine and the other one of which is driven with an electric motor, comprising: target drive-power setting means which sets a target drive-power of the front and rear wheel drive vehicle on the basis of operating conditions thereof, wherein the control device controls an engine drive-power and a motor drive-power on the basis of a distribution ratio, which is set in consideration of the target drive-power, a vehicle speed, and a ratio between a change in an amount of fuel consumption and a change in an amount of electric power consumption during an operation of the electric motor.

In the control device for the front and rear wheel drive vehicle, the control device further comprises distribution-ratio setting means which calculates $$(EF-AF)/PU$$

where $EF$=the amount of fuel consumption attained when the target drive-power is achieved with the engine drive-power;

$AF$=the amount of fuel consumption which is predicted when the motor drive-power is added to the engine drive-power to achieve the target drive-power; and $PU$=the amount of electric power consumption when the motor drive-power is added;

on the basis of the target drive-power and the vehicle speed, and sets a drive-power distribution ratio between the engine drive-power and the motor drive-power in accordance with the calculated value; wherein the control device controls the engine drive power and the motor drive power on the basis of the drive-power distribution ratio set by the distribution-ratio setting means.

With such a control device for the front and rear wheel drive vehicle, during the assist-mode with the drive power of the electric motor, the distribution-ratio setting means functions to select an assist ratio (that is, the drive-power distribution-ratio) of the electric motor to maximize the ratio of "the decremental amount of fuel consumption due to the assist-mode versus the amount of electric power consumption due to the motor drive-power" (that is, at a value to maximize the decremental amount of fuel consumption versus the electric power consumption due to the motor-assist-mode), thereby setting the engine drive-power and the motor drive-power. As a result, it is possible for the control device to reduce the electric power consumption to an extremely low value while decreasing the fuel consumption by the maximum limit, with a resultant improvement in an energy efficiency of the hybrid system.

In the control device for the front and rear wheel drive vehicle, the control device further comprises electric storage means adapted to be charged by an electric power generating operation of the electric motor; and charging-mode distribution-ratio setting means which calculates (GF−EF)/PC Where
EF=the amount of fuel consumption attained when the target drive-power is achieved with the engine drive-power;
GF=the amount of fuel consumption which is predicted when the target drive-power is achieved while an electric power output is generated by the electric motor; and
PC=the amount of electric power charge when the electric power output is generated by the electric motor;

on the basis of the target drive-power and the vehicle speed, and sets a charging-mode distribution ratio between the engine drive-power and the motor drive-power in accordance with the calculated value; wherein the control device controls the engine drive power and the motor drive power on the basis of the charging-mode distribution ratio set by the charging-mode distribution-ratio setting means.

With such a control device for the front and rear wheel drive vehicle, when the electric motor generates electric power output, the charging-mode distribution-ratio setting means functions to select an electric-power-generation-ratio for the electric motor (that is, the charging-mode distribution-ratio) such that "the incremental amount of fuel consumption due to the electric power generation of the electric motor versus the power-charging amount of the electric storage means due to electric power output of the electric motor" is minimized (that is, the incremental amount of fuel consumption due to the charging-mode versus the power-charging amount is minimized), thereby setting the engine drive power and the motor drive-power (with the negative value). As a result, it is possible for the control device to maximize the power-charging amount while decreasing the fuel consumption to a level as low as possible to improve the energy efficiency of the hybrid system.

According to a second aspect of the present invention, there is provided a control device for a front and rear wheel drive vehicle having a front wheel pair and a rear wheel pair, one of which is driven with an engine and the other one of which is driven with an electric motor, which comprises sensor means for producing detection signals representative of operating conditions of the front and rear wheel drive vehicle, target drive-power setting means for setting a target drive-power of the front and rear wheel drive vehicle in response to said detection signals, engine drive power setting means for setting an engine drive-power in response to the target drive-power, and motor drive-power setting means for setting a motor drive-power in response to the target drive-power. The control device controls the engine drive-power and the motor drive-power on the basis of a distribution ratio, which is set in consideration of the target drive-power, a vehicle speed, and a ratio between a change in an amount of fuel consumption and a change in an amount of electric power consumption during an operation of the electric motor.

According to a third aspect of the present invention, there is provided a front and rear wheel drive vehicle having a front wheel pair and a rear wheel pair which comprises an engine drivably coupled to one of the front and rear wheel pairs, an electric motor drivably coupled to the other one of said front and rear wheel pairs, sensor means for producing detection signals representative of operating conditions of the front and rear wheel drive vehicle, target drive-power setting means for setting a target drive-power of the front and rear wheel drive vehicle in response to the detection signals, engine drive-power setting means for setting an engine drive-power in response to the target drive-power, and motor drive power setting means for setting a motor drive-power in response to the target drive-power. The engine drive-power and the motor drive-power are controlled on the basis of a distribution ratio, which is set in consideration of the target drive-power, a vehicle speed, and a ratio between a change in an amount of fuel consumption and a change in an amount of electric power consumption during an operation of the electric motor.

The operating conditions indicate driving conditions in regard with running of the front and rear wheel drive vehicle, such as an accelerator pedal's opening degrees and a vehicle speed.

BRIEF DESCRIPTION OF THE DRAWINGS

Preferred embodiments of the present invention will be described below, by way of example only, with reference to the accompanying drawings, in which:

FIG. 4 is a view for illustrating a method of preparing an electric-power-generation-mode drive-power distribution-ratio data map to be employed in an electric-power-generation-mode drive-power distribution-ratio setting unit shown in FIG. 2;

FIGS. 5A to 5D are schematic views illustrating an assist-mode/electric-power-generation-mode changeover data map employed in a map-changeover discriminating unit shown in FIG. 2, wherein FIG. 5A is a view for illustrating the assist-mode/electric-power-generation-mode changeover data map, FIG. 5B is a view for illustrating the assist-mode/electric-power-generation-mode changeover data map when the amount of power remaining in the battery remains at a high level, FIG. 5C is a view for illustrating the assist-mode/electric-power-generation-mode changeover data map when the amount of power remaining in the battery remains at a medium level and FIG. 5D is a view for illustrating the assist-mode/electric-power-generation-mode changeover data map when the amount of power remaining in the battery remains at a low level.

DESCRIPTION OF THE PREFERRED EMBODIMENTS

Figure 1:
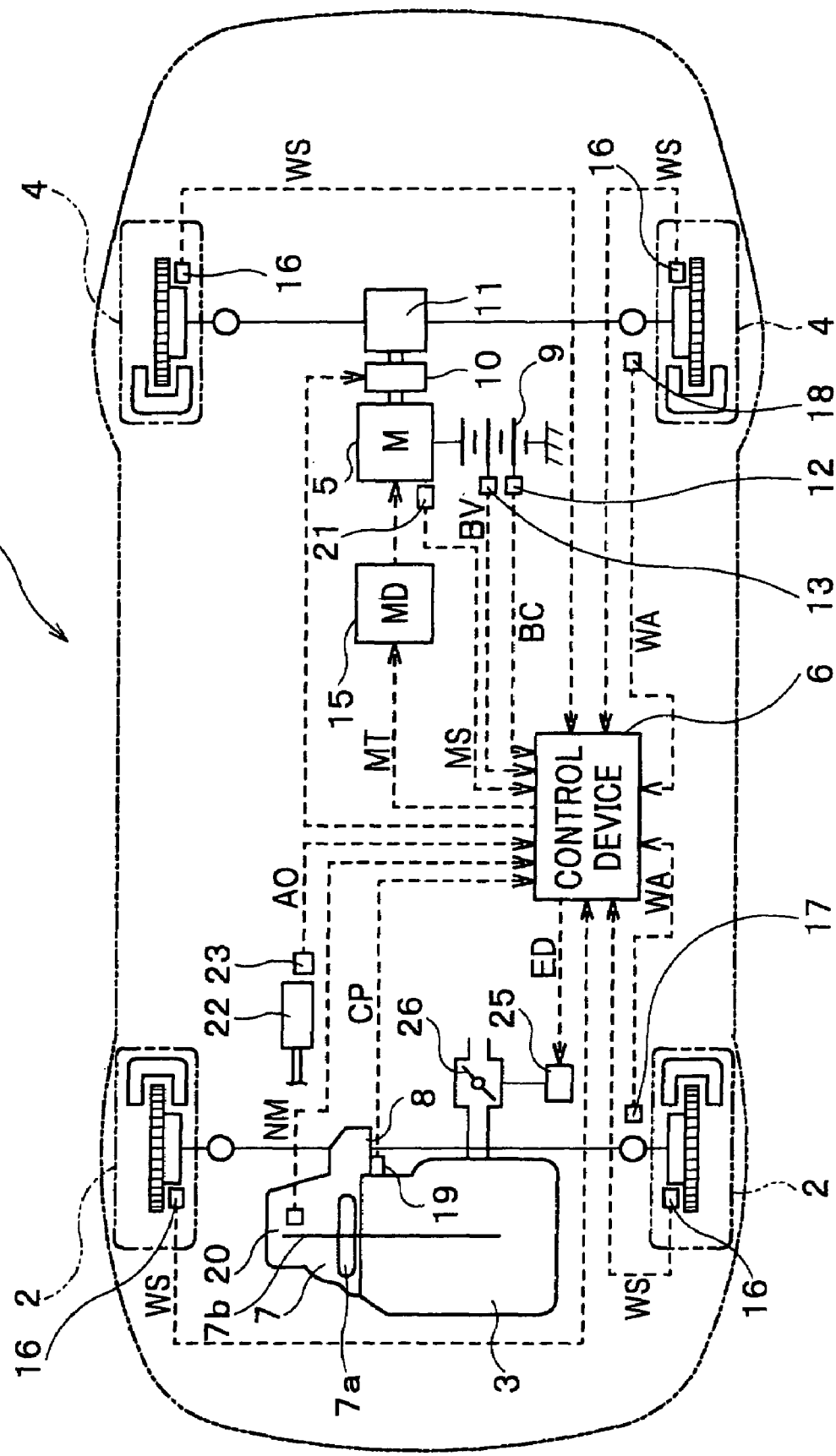
FIG. 1 is a schematic view of an overall structural view of a preferred embodiment of a front and rear wheel drive vehicle according to the present invention.

To describe the present invention more in detail, a preferred embodiment of a control device for a front and rear wheel drive vehicle according to the present invention will be described below in detail with reference to the drawings.

Advanced features of the control device for the front and rear wheel drive vehicle according to the present invention involves the presence of a distribution-ratio setting unit which sets a drive-power distribution-ratio such that the quotient of "the decremental amount of fuel consumption in a motor's assist-mode versus the amount of electric power consumption of the motor" assumes the maximum value to improve an energy efficiency of a hybrid drive system during a motor's assist-operation. In other words, based on the following equation $$C=(EF-AF)/PU \quad (1)$$

where

C=the degree of contribution to the fuel consumption;

EF=the amount of fuel consumption attained when the target drive-power is achieved with the engine drive-power;

AF=the amount of fuel consumption which is predicted when the motor drive-power is added to the engine drive-power to achieve the target drive-power; and PU=the amount of electric power consumption when the motor drive-power is added;

the distribution-ratio setting unit sets the drive-power distribution-ratio such that the calculated value of (EF−AF)/PU takes the maximum value.

Further, the control device employs a charging-mode distribution-ratio setting unit which sets a charging-mode distribution-ratio such that the quotient of "the incremental amount of fuel consumption in a motor's electric-power generation versus the power charging amount due to the motor" assumes the minimum value to improve an energy efficiency of the hybrid drive system during a motor's power-generating mode. In other words, based on the following equation $$CC=(GF-EF)/PC \quad (2)$$

where

CC=the degree of contribution to fuel consumption during the charging mode;

EF=the amount of fuel consumption attained when the target drive-power is achieved with the engine drive-power;

GF=the amount of fuel consumption which is predicted when the target drive-power is achieved while an electric power output is generated by the electric motor; and PC=the amount of electric power charge when the electric power output is generated by the electric motor;

the distribution-ratio setting unit sets the charging-mode distribution-ratio such that the calculated value of (GF−EF)/PC takes the minimum value.

In the illustrated embodiment of the present invention, the front and rear wheel drive vehicle to which the control device of the present invention is applied will be described with reference to a front and rear wheel drive vehicle wherein a front wheel pair is driven with an engine and a rear wheel pair is driven with a motor. In the illustrated embodiment, further, the control device of the present invention includes a drive-power distribution-ratio data map for a motor-assist-mode that serves as a map for enabling a distribution in drive power between an engine drive-power and a motor drive-power, a drive-power distribution-ratio data map for running in an electric-power-generation mode and a drive-power distribution-ratio data map for a slipping mode. Further, the control device functions to change over to the drive-power distribution-ratio map for the slipping mode during a slipping phase and to change over the power-drive distribution-ratio for the motor-assist-mode and the power-drive distribution-ratio for the motor's power-generation-mode on the basis of a remaining amount of a battery to execute the distribution between the engine drive-power and the motor drive-power. Also, the motor drive-power represents a negative value (due to electric power generation) to cause a braking force acting against the engine drive-power.

Now, a structural overview of the front and rear wheel drive vehicle 1 (hereinafter called as a vehicle) is described below in detail in conjunction with FIG. 1. FIG. 1 is an overall structural view of the front and rear wheel drive vehicle.

The vehicle 1 has left and right front wheels 2, 2 which are driven with an engine 3, and left and right rear wheels 4, 4 which are driven with a motor 5. Further, in the vehicle 1, the control device 6 controls the engine 3 and the motor 5.

The engine 3 is laterally mounted on a front area of the vehicle 1. In addition, the engine 3 is coupled through an automatic power transmission 7, which includes a torque converter 7a and a main shaft 7b, and a front differential 8 to the front wheels 2, 2 to drive the same. Further, the engine 3 includes a throttle valve 26, which is connected through a DBW (Drive By Wire) driver 25 to the control device 6. Also, the drive power level of the engine 3 is set by the control device 6 and, on the basis of such drive power level, an opening degree of the throttle valve 26 is electronically controlled by the DBW driver 25. The DBW driver 25 includes a motor for varying the opening degree of the throttle valve 26.

The motor 5 is mounted on a rear area of the vehicle 1. Further, the motor 5 is connected to a battery 9 which serves as a power supply. In addition, the motor 5 is coupled through an electromagnetic clutch 10 and a rear differential 11 to the rear wheels 4, 4 to drive the same. Also, the motor 5 is supplied with an electric power output of the battery 9 and, in a case where the electromagnetic clutch 10 remains in a coupled state, the rear wheels 4, 4 are driven to maintain the vehicle 1 in a four-wheel drive state. On one hand, in an event that the motor 5 is driven with energy of the vehicle 1, the motor 5 functions as an electric power generator to recapture a regenerative power. Further, a current sensor 12 and a voltage sensor 13 are provided in the battery 9 to detect these parameters for producing a battery current signal BC and a battery voltage signal BV, respectively, which are introduced to the control device 6. In this connection, the battery current signal BC and the battery voltage signal BV are used in the control device 6 to calculate the amount of power SOC remaining in the battery 9.

Further, the motor 5 is coupled through a motor driver 15 to the control device 6. In addition, the control device 6 sets the drive power level of the motor 5 required during the four-wheel driving state and the electric power output level (negative drive power level) of the motor 5 during the regenerative power generating mode, based on which the motor driver 15 controls the motor 5. The motor driver 15 serves as a control unit for the motor 5 to perform control for electric current level, etc., of the motor 5. Furthermore, coupling or uncoupling states of the electromagnetic clutch 10 are discriminated with the control device 6, which then controls supply or interruption of electric current to be supplied to a solenoid (not shown) of the electromagnetic clutch 10.

In order to control the engine 3 and the motor 5 with the control device 6, the vehicle 1 has various sensors to introduce various information items to the control device 6. To this end, wheel sensors 16 each of a magnetic flux pick-up type are provided at the left and right front wheels 2, 2 and the left and right rear wheels 4, 4, respectively, to detect respective rotational speeds for producing respective wheel's rotational speed signals WS (also referred to as a "RPM signal"), each representing a train of pulse signals indicative of the rotational speed (also referred to as "RPM"), to be introduced to the control device 6. Further, acceleration sensors 17, 18 are provided at one of the left and right front wheels 2, 2 and at one of the left and right rear wheels 4, 4, respectively, to detect respective acceleration degrees of the front wheels 2, 2 and the rear wheels 4, 4 for producing acceleration signals WA which are introduced to the control device 6. Also, the acceleration sensors 17, 18 are composed of fore and aft G sensors (of a magnetostrictor type), which are mounted in a central area of the vehicle 1, respectively, for detecting acceleration levels in fore and aft directions of the vehicle such that the acceleration signals WA indicative of accelerations in the fore and aft directions of the vehicle detected by the acceleration sensors may be introduced to the control device 6 in order to accurately obtain the vehicle speed. In the control device 6, further, the wheel's RPM signals WS is used for calculating a wheel's speed, and the wheel's RPM signals WS and the acceleration signals WA are used for calculating a vehicle speed.

A crank angle sensor 19 is also mounted to a crankshaft (not shown) of the engine 3 to detect a crank angular position of the crankshaft to produce a crank pulse signal CP representative of a crank angle which is applied to the control device 6. Further, a main shaft RPM sensor 20 of a magnetic pick-up type is mounted to the automatic power transmission 7 to detect a rotational speed of the main shaft 7b for producing a main shaft RPM signal NM, composed of a train of pulse signal indicative of the RPM of the main shaft 7b, which is introduced to the control device 6. The crank pulse signal CP is used in the control device 6 to calculate an engine RPM signal NE. Further, the main shaft RPM signal NM is used in combination with the engine RPM signal NE in the control device 6 to calculate a slip ratio=NM/NE of the torque converter 7a.

In addition, a resolver type motor RPM sensor 21 is mounted to the motor 15 to detect a RPM value of the motor 5 for producing a motor RPM signal MS, composed of a train of pulse signal representative of the RPM value of the motor 5, which is applied to the control device 6.

Further, an accelerator opening sensor 23 is coupled to an accelerator pedal 22 to detect an accelerator's displacement opening degree for producing an accelerator opening signal AO, composed of a train of pulse signals inclusive of ON/OFF states of the accelerator pedal 22, which is applied to the control device 6.

The control device 6 is constructed of a microcomputer (not shown) composed of a RAM (Random Access Memory), a ROM (Read Only Memory), a CPU (Central Processing Unit) and I/O Interfaces, etc. The control device 6 includes a motor-assist-mode drive-power distribution-ratio data map 63d, an electric-power-generation-mode drive-power distribution-ratio data map 64d and a slip-mode drive-power distribution-ratio data map (see FIGS. 3 and 4), which serve as maps for executing distribution of the engine drive-power and the motor drive-power. Further, the control device 6 sets a target drive-power on the basis of the accelerator opening degree and the vehicle speed. In addition, the control device 6 functions to switch to the slip-mode drive-power distribution-ratio setting unit 65 during the slipping operation, and to change over the motor-assist-mode drive-power distribution-ratio setting unit 63 and the electric-power-generation-mode drive-power distribution-ratio setting unit 64 on the basis of the amount of power SOC remaining in the battery 9 during a non-slipping operation, and to set the engine drive-power and the motor drive-power on the basis of respective drive-power distribution-ratio and the target drive-power. Consecutively, the control device 6 generates an engine drive signal ED on the basis of the engine drive-power and a motor-demanded-torque signal MT on the basis of the motor drive-power. Further, the control device 6 outputs the engine drive signal ED to a DBW driver 25 to control the opening degree of the throttle valve 26 for thereby controlling the drive power output of the engine 3. Likewise, the control device 6 outputs the motor-demanded-torque signal MT to the motor driver 15 for thereby controlling the drive power output of the same.

Figure 2:
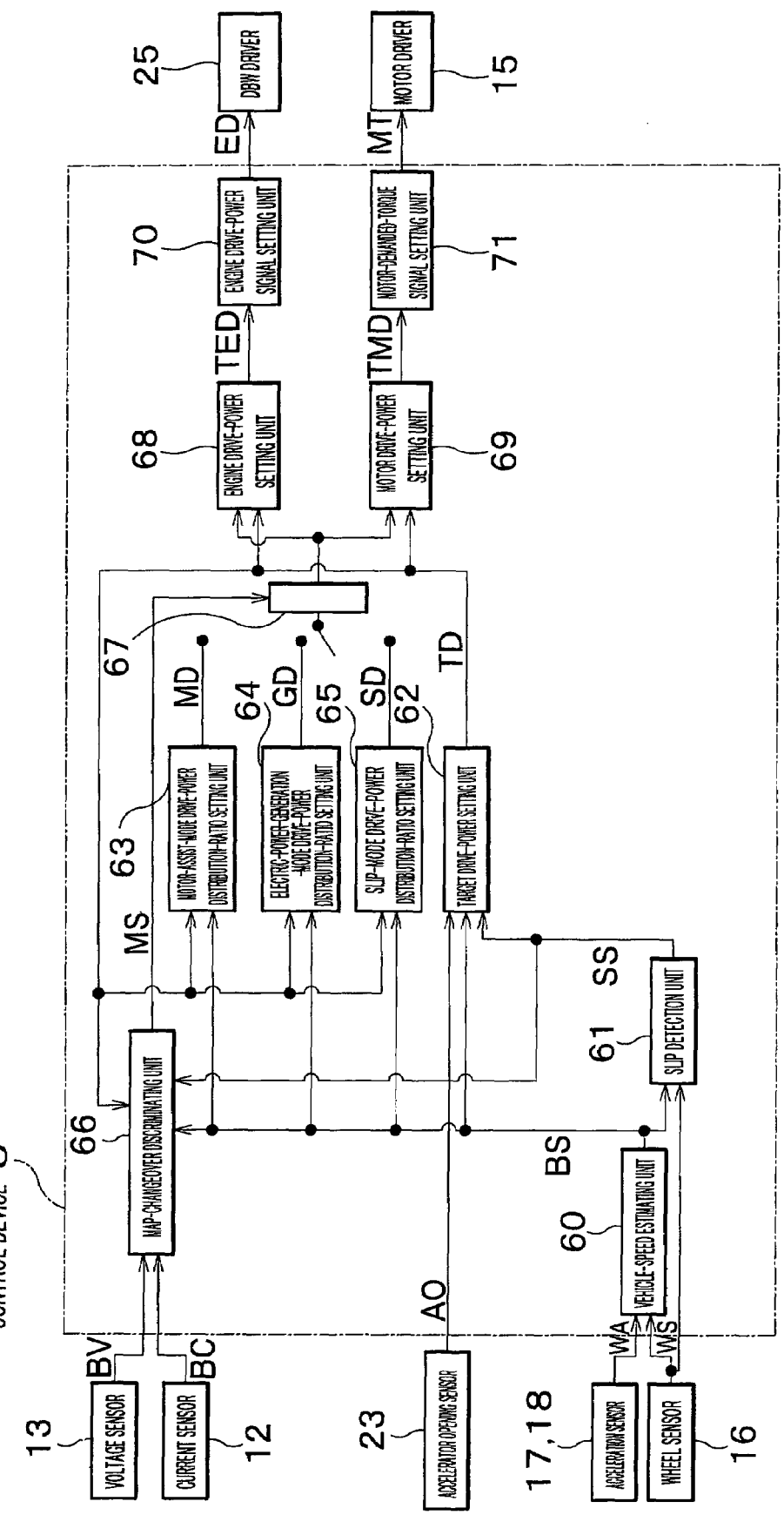
FIG. 2 is a block diagram of a control device of the front and rear wheel drive vehicle shown in FIG. 1.

Now, an overview of the control device 6 is described below in detail in conjunction with FIG. 2, which shows a structural view of the control device 6 for the front and rear wheel drive vehicle according to the present invention.

The control device 6 includes a vehicle-speed estimating unit 60, a slip detection unit 61, a target drive-power setting unit 62, a motor-assist-mode drive-power distribution-ratio setting unit 63, an electric-power-generation-mode drive-power distribution-ratio setting unit 64, a slip-mode drive-power distribution-ratio setting unit 65, a map changeover discriminating unit 66, a map changeover unit 67, an engine drive-power setting unit 68, a motor drive-power setting unit 69, an engine drive-power signal setting unit 70 and a motor-demanded-torque signal setting unit 71.

Initially, the vehicle-speed estimating unit 60 is described in detail. The vehicle-speed estimating unit 60 is applied with the wheel's RPM signals WS from the wheel sensors 16 and the acceleration signals WA outputted by the acceleration sensors 17, 18 to produce a vehicle speed signal BS, which is applied to the slip detection unit 61, the target drive-power setting unit 62, the motor-assist-mode drive-power distribution-ratio setting unit 63, the electric-power-generation-mode drive-power distribution-ratio setting unit 64, the slip-mode drive-power distribution-ratio setting unit 65 and the map changeover discriminating unit 66. The vehicle-speed estimating unit 60 functions to calculate the wheel speeds of the respective wheels 2, 2, 4, 4 on the basis of the wheel's RPM signals WS. Further, the vehicle-speed estimating unit 60 functions to calculate the vehicle speed BS of the vehicle 1 on the basis of a history of the past vehicle speed, the wheel speeds and the acceleration signals WA.

Next, the slip detection unit 61 is described below in detail. The slip detection unit 61 is applied with the wheel's RPM signals WS outputted by the wheel sensors 16, and the vehicle speed BS outputted from the vehicle-speed estimating unit 60 to produce a slip detection signal SS which is applied to the target drive-power setting unit 62 and the map changeover discriminating unit 66. The slip detection unit 61 functions to calculate wheel speeds of the respective wheels 2, 2, 4, 4 on the basis of the wheel RPM signals WS. Further, the slip detection unit 61 functions to calculate slip rates of the respective wheels 2, 2, 4, 4 on the basis of the wheel speed of the respective wheels and the vehicle speed BS. In addition, the slip detection unit 61 discriminates whether the vehicle 1 remains in a slipping condition or in a non-slipping condition on the basis of the slip rates of the respective wheels 2, 2, 4, 4 such that, when the vehicle 1 remains in the slipping condition, the slip detection unit 61 produces a slip detection signal SS of "1" and, when the vehicle 1 remains in the non-slipping condition, the slip detection unit 61 produces the slip detection signal SS of "0". The discrimination whether the vehicle 1 remains in the slipping condition or in the non-slipping condition is executed on the basis of the slip rates of the four-wheel rotating conditions when the vehicle 1 runs on a dry asphalt, and the presence of the slipping condition is recognized even if there exists a little difference in slip rates from the aforementioned slip rates.

Now, the target drive-power setting unit 62 is described below in detail. The target drive-power setting unit 62 is applied with the accelerator opening signal AO delivered from the accelerator opening sensor 23, the vehicle speed signal BS delivered from the vehicle-speed estimating unit 60 and the slip detection signal SS delivered from the slip detection unit 61 to produce a target drive-power TD which is outputted to the motor-assist-mode drive-power distribution-ratio setting unit 63, the electric power-generation-mode drive-power distribution-ratio setting unit 64, the slip-mode drive-power distribution-ratio setting unit 65, the map changeover discriminating unit 66, the engine drive-power setting unit 68 and the motor drive-power setting unit 69. Further, the target drive-power TD is indicative of a drive-power that is required for the vehicle 1 and includes drive-power outputs produced by the engine 3 and the motor 5. In this connection, when the motor 5 functions as an electric power generator, all of the target drive-power TD is produced by the engine 3. In this even, further, the energy that is used by the motor 5 is produced by the engine 3.

The target drive-power setting unit 62 includes a memory unit such as ROM etc. that stores a table associated with the vehicle speed BS and the accelerator opening signal AO in terms of the target drive-power TD. The table is set on the basis a preliminary experimental test result or a designed value. Further, the table is arranged such that the larger the opening degree of the accelerator opening, the larger will be the target drive-power and the higher the vehicle speed, the smaller will be the target drive-power. In the event that the slip detection signal SS indicates "0", the target drive-power setting unit 62 reads out the target drive-power TD associated with an address in terms of the vehicle speed BS and the accelerator opening signal AO. On the contrary, In the event that the slip detection signal SS indicates "1", the target drive-power setting unit 62 calculates a road-surface-frictional-coefficient estimated value (with the frictional-coefficient hereinafter referred to as "$\mu$") on the basis of the slip rates of the respective wheels 2, 2, 4, 4. Also, the target drive-power setting unit 62 calculates a drive power to be transmitted to a road surface during the slipping operation on the basis of the total weight of the vehicle 1 and the road-surface $\mu$-estimated value, with the drive power to be transmitted being assigned as the target drive-power TD.

Next, the motor-assist-mode drive-power distribution-ratio setting unit 63 is described below in detail. The motor-assist-mode drive-power distribution-ratio setting unit 63 is applied with the vehicle speed BS from the vehicle-speed estimating unit 60 and the target drive-power TD from the target drive-power setting unit 62 to produce a motor-assist-mode drive-power distribution-ratio MD which is applied to the map changeover unit 67.

The motor-assist-mode drive-power distribution-ratio setting unit 63 includes a memory unit such as ROM etc., that stores a motor-assist-mode drive-power distribution-ratio data map 63d (see FIG. 3) associated with or interactive with the vehicle speed BS, and the target drive-power TD in terms of the motor-assist-mode drive-power distribution-ratio MD. The motor-assist-mode drive-power distribution-ratio data map 63d is set on the basis of the preliminary experimental test result or the designed value. Further, the motor-assist-mode drive-power distribution-ratio setting unit 63 reads out a motor-assist-mode drive-power distribution-ratio MD interactive with an address in terms of the vehicle speed BS and the target drive-power TD. Also, during an assist mode owing to the drive power produced by the motor 5, further, the motor-assist-mode drive-power distribution-ratio data map 63d serves as a map wherein the drive-power distribution-ratio between the engine drive-power and the motor drive-power, to enable fuel consumption to be improved at the maximum efficiency while reducing electrical power consumption to the minimum value, is associated with the vehicle speed and the accelerator opening signal.

Figure 3:
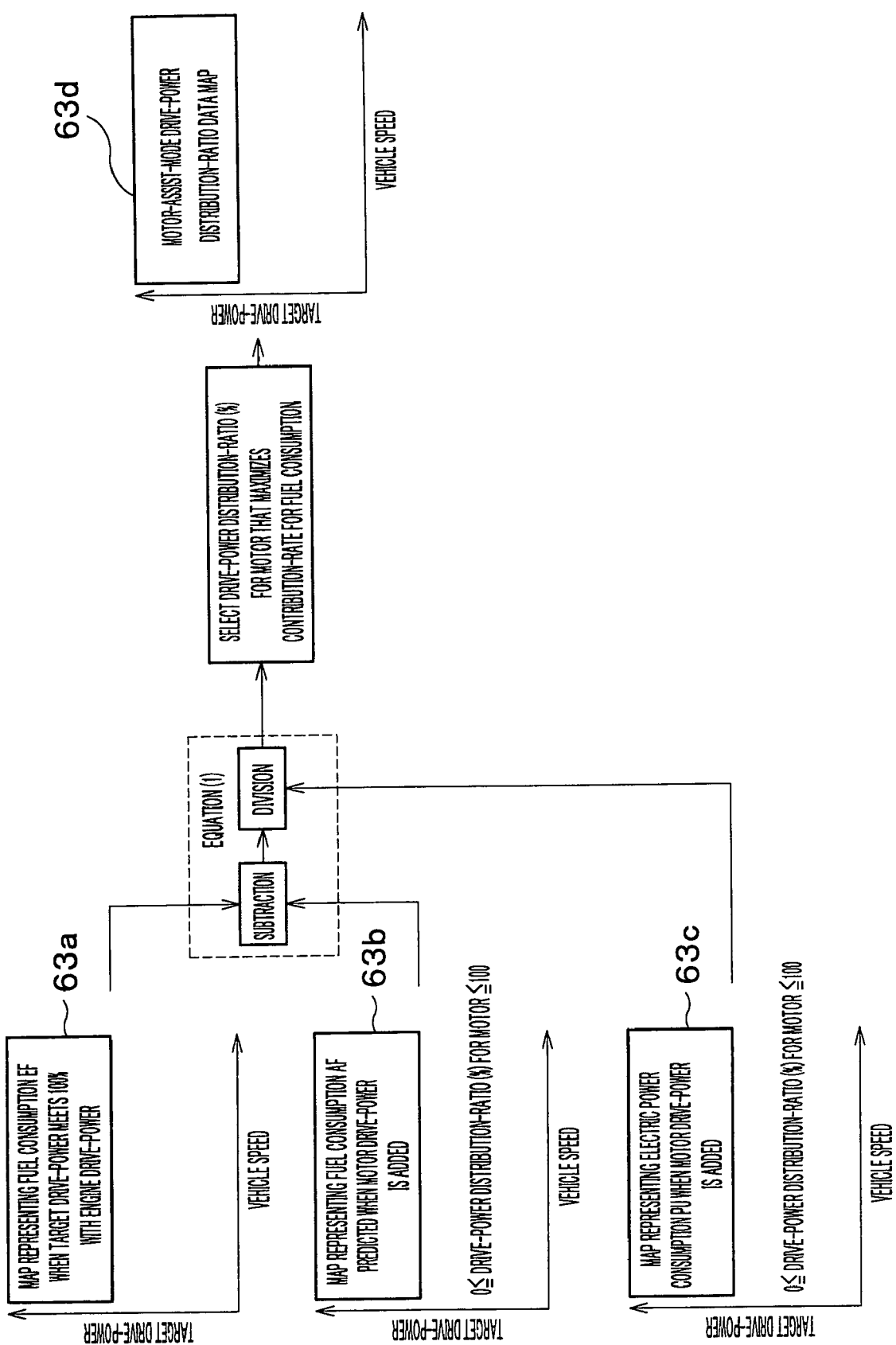
FIG. 3 is a view for illustrating a method of preparing a motor-assist-mode drive-power distribution-ratio data map to be employed in a motor-assist-mode drive-power distribution-ratio setting unit shown in FIG. 2.

Referring to FIG. 3, a production process for the motor-assist-mode drive-power distribution-ratio data map 63d is described below in detail. Also, FIG. 3 is a view for illustrating a sequence of operations for producing the motor-assist-mode drive-power distribution-ratio data map 63d. First, the data maps 63a, 63b, 63c are prepared.

The data map 63a represents a fuel consumption data map wherein 100% of the target drive-power is achieved with drive power of the engine 3. In particular, the data map 63a represents a map indicative of the amount of fuel consumption of the engine 3 which is plotted at respective matrix points between the respective vehicle speeds, that are plotted at given vehicle speed intervals (for example, at an interval of 1 km/h) starting from 0 km/h to the maximum vehicle speed, and the respective target drive-power levels that are plotted at given intervals of the drive power levels (for example, at an interval of 1 N).

Also, the data map 63b represents a fuel-consumption data map which is predicted in a case wherein the target drive-power is achieved with an assistance of the drive power of the motor 5. Further, in an event that the target drive-power is assisted with the motor 5, since the drive power of the motor 5 to be provided for assistance varies in a value ranging from 0% to 100% of the target drive-power level, the data map 63b is plotted into a data map representing the amount of fuel consumption that is plotted at given rate intervals (for example, at an interval of 1%) in terms of the drive-power distribution-ratio (%) that varies in a value ranging from 0 to 100%.

Also, the data map 63c includes a plurality of map files plotted in terms of the respective drive-power distribution-ratios (%) assigned to the motor 5. In particular, the data map 63c represents a map indicative of the amount of electric power consumption of the motor 5, associated with the respective drive-power distribution-ratios to be assigned thereto, which is plotted at respective matrix points between the respective vehicle speeds, that are plotted at given vehicle speed intervals (for example, at an interval of 1 km/h) starting from 0 km/h to the maximum vehicle speed, and the respective target drive-power levels that are plotted at given intervals of the drive power levels (for example, at an interval of 1 N).

Next, the degree of contribution to the fuel consumption is calculated for a case wherein the drive-power distribution-ratio to be assigned to the motor 5 is plotted at the given rate intervals (for example, at the interval of 1%) in a value ranging from 0% to 100% relative to the matrix points between the respective vehicle speeds, that are plotted at the given vehicle speed intervals (for example, at the interval of 1 km/h) starting from 0 km/h to the maximum vehicle speed, and the respective target drive-power levels that are plotted at given intervals of the drive power levels (for example, at the interval of 1 N), on the basis of the aforementioned equation (1) by using respective values of the data maps 63a, 63b, 63c. Accordingly, in an event that the drive-power distribution-ratio (%) to be assigned to the motor 5 is divided at the interval of the given ratio of 1%, the degree of contribution to the fuel consumption is calculated to have 101 units. Subsequently, the maximum degree of contribution to the fuel consumption is selected from the number of degrees of contribution to the fuel consumption calculated in such plural units, thereby selecting the drive power distribution ratio (%), to be assigned to the motor 5, associated with the selected degrees of contribution to the fuel consumption. That is, an operation is implemented to select the drive power distribution ratio (%), to be assigned to the motor 5, that maximizes a quotient of "a decreased amount of fuel consumption, predicted when the drive power is needed by the motor 5, versus electric power consumption when the drive power is added with the motor 5". As a result, controlling the engine 3 and the motor 5 on the basis of the selected distribution-ratio allows the amount of fuel consumption to be reduced by the maximum limit and the amount of electric power consumption to be reduced by the maximum limit, resulting in an optimum energy efficiency in the hybrid drive system composed of the engine 3 and the motor 5. In this connection, the amount of fuel consumption to be attained when 100% of the target drive-power is achieved with the drive power of the engine 3 becomes higher than the amount of fuel consumption at all times that is predicted in a case where the drive power is needed by the motor 5.

Also, in the illustrated embodiment, a symbol "EF" in the equation (1) represents the amount of fuel consumption of the engine 3 that is plotted at the matrix points between the respective vehicle speeds and the associated respective target drive-power appearing on the data map 63a, a symbol "AF" represents the amount of fuel consumption of the engine 3 that is predicted in a case where the respective distribution-ratios, to be assigned to the motor 5, is plotted at the respective matrix points between the respective vehicle speeds and the associated respective target drive-power appearing on the data map 63b and a symbol "PU" represents the amount of electric power consumption in a case where the respective distribution ratios, to be assigned to the motor 5, is plotted at the respective matrix points between the respective vehicle speeds and the associated respective target drive-power appearing on the data map 63c.

Lastly, an operation is performed to provide the motor-assist-mode drive-power distribution-ratio data map 63d on the basis of the respective drive-power distribution-ratios, to be assigned to the motor 5, that are selected in terms of the respective matrix points between the respective vehicle speeds and the respective target drive-power levels. As a consequence, the presence of the motor-assist-mode drive-power distribution-ratio data map 63d allows the motor-assist-mode drive-power distribution-ratio MD to be selected such that it optimizes the energy efficiency to be achieved during the assist-mode of the motor 5, in terms of an arbitrary vehicle speed BS and an arbitrary target drive-power TD. Also, since the data maps 63a, 63b, 63c represent the maps that are set respectively on the basis of operating characteristics of the engine 3 and the motor 5 which are mounted in the vehicle 1, the motor-assist-mode drive-power distribution-ratio data map 63d serves as a map that reflects the operating characteristics of the engine 3 and the motor 5 mounted on the vehicle 1.

Next, the electric-power-generation-mode drive-power distribution-ratio setting unit 64 is described below in detail. The electric-power-generation-mode drive-power distribution-ratio setting unit 64 is applied with the vehicle speed BS from the vehicle-speed estimating unit 60 and the target drive-power TD from the target drive-power setting unit 62 to produce an electric-power-generation-mode drive-power distribution-ratio GD which is applied to the map changeover unit 67. The electric-power-generation-mode drive-power distribution-ratio setting unit 64 includes a memory unit such as ROM etc., that stores the electric-power-generation-mode drive-power distribution-ratio data map 64d (see FIG. 4) associated with the vehicle speed BS, and the target drive-power TD in terms of the electric-power-generation-mode drive-power distribution-ratio GD. The electric-power-generation-mode drive-power distribution-ratio data map 64d is set on the basis of the preliminary experimental test result or the designed value. Further, the electric-power-generation-mode drive-power distribution-ratio setting unit 64 reads out the electric-power-generation-mode drive-power distribution-ratio GD addressed with the vehicle speed BS and the target drive-power TD. Also, during charging mode owing to the electrical power output produced by the motor 5, further, the electric-power-generation-mode drive-power distribution-ratio data map 64d serves as a map wherein the electric-power-generation-mode drive-power distribution-ratio is correlated with the vehicle speed and the accelerator opening signal to restrict the fuel consumption by the maximum limit from being deteriorated while obtaining the maximum charging amount of the battery 9.

Referring to FIG. 4, a production process for the electric-power-generation-mode drive-power distribution-ratio data map 64d is described below in detail. Also, FIG. 4 is a view for illustrating a sequence of operations for producing the electric-power-generation-mode drive-power distribution-ratio data map 64d. First, the data maps 64a, 64b, 64c are prepared. Also, since the data map 64a is identical with the aforementioned data map 63a and, therefore, a detailed description of the same is herein omitted.

The data map 64b represents a fuel-consumption data map that is predicted in a case wherein the electric power generation is carried out by the motor 5. Further, since the energy of the vehicle 1, which is used by the motor 5 to perform the electric power generation, is produced with the drive-power of the engine 3, the engine 3 is arranged to produce the drive-power output, to be consumed by the motor 5, at a rate ranging from 0% to 100% of the target drive-power level. To this end, the data map 64b includes a plurality of map files associated with the respective drive-power distribution-ratios (%) assigned to the motor 5 during the charging mode. When the motor 5 performs the electric power generation, also, since the drive-power is further added to the target drive-power, the charging-mode distribution ratio (%) to be applied to the motor 5 is expressed as a negative value. In particular, the data map 64b represents a map indicative of the amount of fuel consumption that is predicted in case of the respective charging-mode distribution-ratios at the respective matrix points between the respective vehicle speeds, that are plotted at given vehicle speed intervals (for example, at an interval of 1 km/h) starting from 0 km/h to the maximum vehicle speed, and the respective target drive-power levels that are plotted at given intervals of the drive-power levels (for example, at the interval of 1 N).

Further, the data map 64c is a power-charging amount indicating map that is used when the electric power generation is carried out by the motor 5. Further, when the electric power output is generated by the motor 5, since the motor 5 performs the electric power generation with the target drive-power varying in a value ranging from −100% to 0%, the data map 64c is plotted in terms of the power-charging amount in a case where the charging-mode distribution-ratio (%), to be applied to the motor 5, is plotted at the given rate intervals (for example, at the interval of 1%) in a value ranging from −100% to 0%. Accordingly, the data map 64c includes a plurality of map files plotted in terms of the respective charging-mode distribution-ratios (%) to be applied to the motor 5. In particular, the map data 64c represents a map indicative of the power-charging amount in case of the respective charging-mode distribution-ratios, to be applied to the motor 5, appearing at respective matrix points between the respective vehicle speeds, that are plotted at the given vehicle speed intervals (for example, at the interval of 1 km/h) starting from 0 km/h to the maximum vehicle speed, and the respective target drive-power levels that are plotted at the given intervals of the target drive-power levels (for example, at an interval of 1 N) with variation ranging from 0 N to the maximum target drive-power level.

Next, the degree of contribution to the fuel consumption during the charging mode is calculated for a case wherein the charging-mode distribution-ratio (%) to be assigned to the motor 5 is plotted at the given rate intervals (for example, at the interval of 1%) in a value ranging from −100% to 0% relative to the matrix points between the respective vehicle speeds, that are plotted at the given vehicle speed intervals (for example, at the interval of 1 km/h) starting from 0 km/h to the maximum vehicle speed, and the respective target drive-power levels that are plotted at given intervals of the drive-power levels (for example, at the interval of 1 N), on the basis of the aforementioned equation (2) by using respective values of the data maps 64a, 64b, 64c. Accordingly, in an event that the charging-mode distribution-ratio (%) to be assigned to the motor 5 is divided at the interval of the given ratio of 1%, the degree of contribution to the fuel consumption is calculated to have 101 units. Subsequently, the minimum degree of contribution to the fuel consumption during the charging mode is selected from the number of degrees of contribution to the fuel consumption during the charging mode calculated in such plural units, thereby selecting the charging-mode drive-power distribution-ratio (%), to be assigned to the motor 5, associated with the selected degrees of contribution to the fuel consumption during the charging mode. That is, an operation is implemented to select the charging-mode distribution ratio (%), to be assigned to the motor 5, that minimizes a quotient of "an increased amount of fuel consumption, that is predicted when the electric power output is generated by the motor 5, versus a power-charging amount when the electric power output is generated by the motor 5. As a result, controlling the engine 3 and the motor 5 on the basis of the selected charging-mode distribution ratio allows the amount of fuel consumption to be reduced by the maximum limit and the power charging amount to be increased by the maximum limit, resulting in an optimum energy efficiency in the hybrid drive system composed of the engine 3 and the motor 5. In this connection, the amount of fuel consumption to be attained when 100% of the target drive-power is achieved with the drive power of the engine 3 becomes lower than the amount of fuel consumption at all times that is predicted in a case where the electric power generation is performed with the motor 5.

Also, in the illustrated embodiment, a symbol "EF" in the equation (2) represents the amount of fuel consumption of the engine 3 that is plotted at the matrix points between the respective vehicle speeds and the associated respective target drive-power appearing on the data map 64a, a symbol "GF" represents the amount of fuel consumption of the engine 3 that is predicted in a case where the respective charging-mode distribution-ratios, to be assigned to the motor 5, are plotted at the respective matrix points between the respective vehicle speeds and the associated respective target drive-power appearing on the data map 64b, and a symbol "PC" represents the power-charging amount in a case where the respective charging-mode distribution-ratios, to be assigned to the motor 5, is plotted at the respective matrix points between the respective vehicle speeds and the associated respective target drive-power appearing on the data map 64c.

Lastly, an operation is performed to provide the electric-power-generation-mode drive-power distribution-ratio data map 64d on the basis of the respective drive-power distribution-ratios, to be assigned to the motor 5, that are selected in terms of the respective matrix points between the respective vehicle speeds and the respective target drive-power levels. As a consequence, the presence of the electric-power-generation-mode drive-power distribution-ratio data map 64d allows the electric-power-generation-mode drive-power distribution-ratio GD to be selected such that it optimizes the energy efficiency to be achieved during the electric power generation of the motor 5, in terms of the arbitrary vehicle speed BS and the arbitrary target drive-power TD. Also, since the data maps 64a, 64b, 64c represent the maps that are set respectively on the basis of operating characteristics of the engine 3 and the motor 5 which are mounted in the vehicle 1, the electric-power-generation-mode drive-power distribution-ratio data map 64d serves as a map that reflects the operating characteristics of the engine 3 and the motor 5 mounted on the vehicle 1.

Next, the slip-mode drive-power distribution-ratio setting unit 65 is described below in detail. The slip-mode drive-power distribution-ratio setting unit 65 is applied with the vehicle speed BS and the target drive-power TD from the vehicle-speed estimating unit 60 and the target drive-power setting unit 62, respectively, to produce a slip-mode drive-power distribution-ratio SD which is applied to the map changeover unit 67. The slip-mode drive-power distribution-ratio setting unit 65 includes a memory unit such as ROM, etc., for storing a slip-mode drive-power distribution-ratio data map (not shown), that is associated with a road-surface $\mu$-estimated value, the vehicle speed BS and the target drive-power TD in terms of the slip-mode drive-power distribution-ratio SD. The slip-mode drive-power distribution-ratio data map is set on the basis of the preliminary experimental test results and the designed values. Also, the road-surface $\mu$-estimated value is calculated by using the slip rates etc., that is calculated in the slip detection unit 61. In addition, the slip-mode drive-power distribution-ratio setting unit 65 reads out the slip-mode drive-power distribution-ratio SD addressed with the road-surface $\mu$-estimated value, the vehicle speed BS and the target drive-power TD.

Now, the map changeover discriminating unit 66 is described below in detail. The map changeover discriminating unit 66 is applied with the battery current signal BC, the battery voltage signal BV, the vehicle speed BS, the slip detection signal SS and the target drive-power TD delivered from the current sensor 12, the voltage sensor 13, the vehicle-speed estimating unit 60, the slip detection unit 61 and the target drive-power setting unit 62, respectively, to produce a map discriminating signal MS which is applied to the map changeover unit 67. To this end, the map changeover discriminating unit 66 stores an assist-mode/electric-power-generation-mode changeover data map 66a (see FIG. 5) for discriminating a particular usage range of the drive-power distribution-ratio data map in response to the vehicle speed BS and the target drive-power TD. The assist-mode/electric-power-generation-mode changeover data map 66a is set on the basis of the preliminary experimental test results or the designed values. First, the map changeover discriminating unit 66 functions to calculates the amount of power SOC remaining in the battery 9 on the basis of the battery current signal BC and the battery voltage signal BV. Upon receipt of the slip discriminating signal SS of "1", the map changeover discriminating unit 66 sets a "slip" phase that is represented as a slip discriminating signal SS. Upon receipt of the slip discriminating signal of "0", the map changeover discriminating unit 66 discriminates whether to use the motor-assist-mode drive-power distribution-ratio data map 63d or to use the electric-power-generation-mode drive-power distribution-ratio data map 64d in response to the assist-mode/electric-power-generation-mode changeover data map 66a on the basis of the vehicle speed BS and the target drive-power TD. When using the motor-assist-mode drive-power distribution-ratio data map 63d, the map changeover discriminating unit 66 sets a "motor-assist-mode" that is represented with the map discriminating signal MS. When using the electric-power-generation-mode drive-power distribution-ratio data map 64d, the map changeover discriminating unit 66 sets an "electric-power-generation-mode" that is represented with the map discriminating signal MS.

Figure 5A:
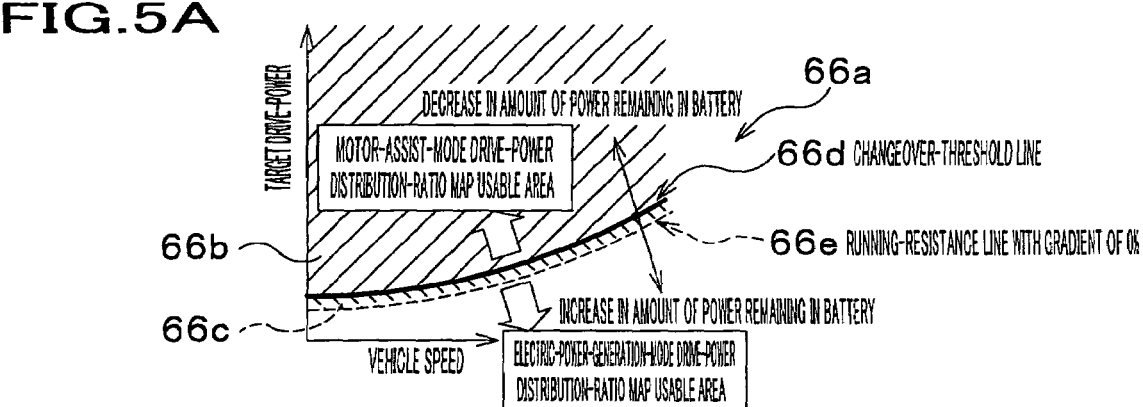
Figure 5B:
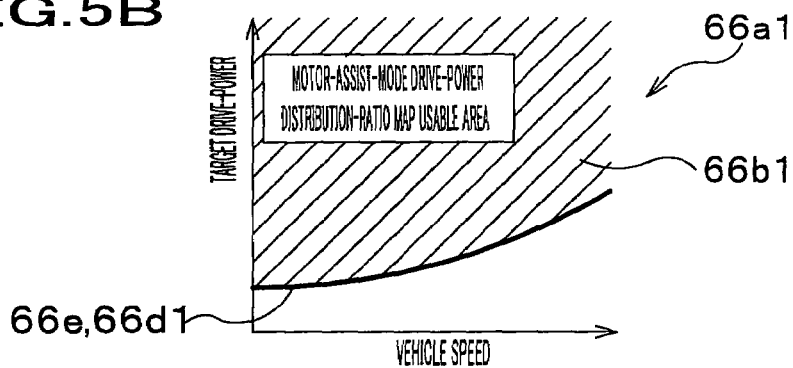
Figure 5C:
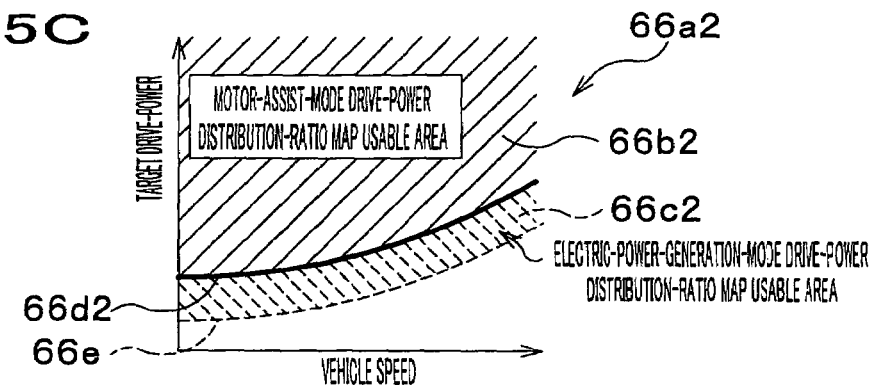
Figure 5D:
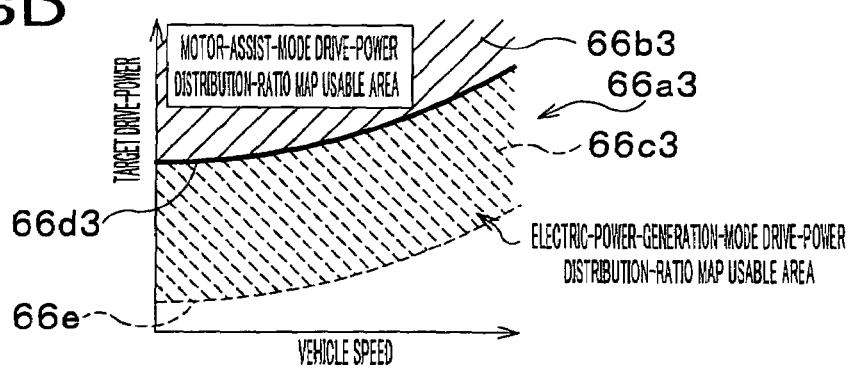

Now, the assist-mode/electric-power-generation-mode changeover data map 66a is described below in detail with reference to FIGS. 5A to 5D which show the assist-mode/electric-power-generation-mode changeover data map 66a. In particular, FIG. 5A shows a graph for illustrating the assist-mode/electric-power-generation-mode changeover data map. FIG. 5B is a view for illustrating an operation of the control device wherein the amount of power remaining in the battery remains at a high value. FIG. 5C is a view for illustrating an operation of the control device wherein the amount of power remaining in the battery remains at a medium value. FIG. 5D is a view for illustrating the operation of the control device wherein the amount of power remaining in the battery remains at a low value. The assist-mode/electric-power-generation-mode changeover data map 66a serves as a map for discriminating whether to use the motor-assist-mode drive-power distribution-ratio data map 63d or to use the electric-power-generation-mode drive-power distribution-ratio data map 64d (see FIGS. 3 and 4) as the drive-power distribution-ratio data map on the basis of the relationship between the target drive-power and the vehicle speed. To this end, the assist-mode/electric-power-generation-mode changeover data map 66a has a changeover-threshold line 66d that divides a usable area into a motor-assist-mode drive-power distribution-ratio map usable area (hereinafter referred to a motor-assist-mode area) 66b, indicated by a hatching area, and an electric-power-generation-mode drive-power distribution-ratio map usable area (hereinafter referred to as an electric-power-generation-mode area) 66c. Further, the changeover-threshold line 66d of the assist-mode/electric-power-generation-mode changeover data map 66a is shifted in position according to the amount of power remaining in the battery to thereby vary the motor-assist-mode area 66b and the electric-power-generation-mode area 66c. For this reason, the assist-mode/electric-power-generation-mode changeover data map 66a includes a plurality of data maps independence on the amount of power remaining in the battery.

As shown in FIG. 5A, the assist-mode/electric-power-generation-mode changeover data map 66a has the axis of abscissa plotted with the vehicle speed and the axis of ordinate plotted with the target drive-power. Further, the changeover-threshold line 66d of the assist-mode/electric-power-generation-mode changeover data map 66a is set to be parallel to and above a running resistance line 66e with a gradient of 0%. Further, the motor-assist-mode area 66b has the target drive-power that varies in a higher range area than the changeover-threshold line 66d relative to the vehicle speed, and the electric-power-generation-mode area 66c that varies in an area between the running resistance line 66e and the changeover-threshold line 66d. In addition, the assist-mode/electric-power-generation-mode changeover data map 66a is defined such that, as the amount of power remaining in the battery increases, the changeover-threshold line 66d is plotted in close vicinity of the running resistance line 66e to increase the motor-assist-mode area 66b. In contrast, the assist-mode/electric-power-generation-mode changeover data map 66a is defined such that, as the amount of power remaining in the battery decreases, the changeover-threshold line 66d is spaced from the running resistance line 66e to increase the electric-power-generation-mode area 66c. In such a manner, the smaller the amount of power remaining in the battery, the larger will be the electric-power-generation-mode area 66c. Thus, even when the vehicle is running at a constant speed, the battery is charged with the motor 5 when the amount of power remaining in the battery begins to decrease and, when the amount of power remaining in the battery still continues to decrease, the battery is charged with the motor 5 even in a case where the vehicle is running at a slightly accelerated condition. Further, when the amount of power remaining in the battery still decreases, the battery is charged with the motor even in a case where the vehicle is running under a strongly accelerated condition. Also, it is to be noted that the running resistance line 66e serves as a line for indicating the running resistance at the flat surface road plotted in relationship between the vehicle speed and the target drive-power. In this connection, if the drive power of the vehicle becomes less than the running resistance under a condition where the accelerator pedal is depressed just a little bit, it becomes difficult for the vehicle to maintain the current running speed, with a resultant decrease in the vehicle speed.

FIG. 5B shows an assist-mode/electric-power-generation-mode changeover data map 66a1 to be used in a case where the amount of power remaining in the battery remains at a sufficient value and where a changeover-threshold line 66d1 is aligned on the running resistance line 66e. In such a case, since the amount of power remaining in the battery remains at a high value, the battery 9 does not need to be charged. Thus, in the assist-mode/electric-power-generation-mode changeover data map 66a1, only the motor-assist-mode area (designated by hatching area with a solid line) 66b1 is set.

In such a case, the charging operation is carried out with the motor 5 only during the decelerating condition of the vehicle 1.

FIG. 5C shows an assist-mode/electric-power-generation-mode changeover data map 66a2 to be used in a case where the amount of power remaining in the battery decreases and where a changeover-threshold line 66d2 is spaced from the running resistance line 66e. In such a case, since the amount of power remaining in the battery remains at a low value, the number of frequencies for charging the battery 9 is increased to the maximum value. To this end, the assist-mode/electric-power-generation-mode changeover data map 66a2 is set such that the electric-power-generation-mode area (designated by hatching area with dotted lines) 66c2 is increased to the maximum value and the motor-assist-mode area (designated by hatching area with a solid line) 66b2 is decreased to the minimum value. In such a case, the charging operation is carried out with the motor 5 even when the vehicle 1 is running at the constant speed or is running under the slightly accelerated condition.

FIG. 5D shows an assist-mode/electric-power-generation-mode changeover data map 66a3 to be used in a case where the amount of power remaining in the battery decreases and where a changeover-threshold line 66d3 is mostly spaced from the running resistance line 66e. In such a case, since the amount of power remaining in the battery remains at an extremely low value, the number of frequencies for charging the battery 9 is increased to the maximum value. To this end, the assist-mode/electric-power-generation-mode changeover data map 66a3 is set such that the electric-power-generation-mode area (designated by hatching area with dotted lines) 66c3 is increased to the maximum value and the motor-assist-mode area (designated by hatching area with a solid line) 66b3 is decreased to the minimum value. In such a case, the charging operation is carried out with the motor 5 even when the vehicle 1 is running under the strongly accelerated condition.

Now, the map changeover unit 67 is described below in detail. The map changeover unit 67 is applied with the motor-assist-mode drive-power distribution-ratio MD, the electric-power-generation-mode drive-power distribution-ratio GD and the slip-mode drive-power distribution-ratio SD delivered from the motor-assist-mode drive-power distribution-ratio setting unit 63, the electric-power-generation-mode drive-power distribution-ratio setting unit 64 and the slip-mode drive-power distribution-ratio setting unit 65, respectively, to output either one of the motor-assist-mode drive-power distribution-ratio MD, the electric-power-generation-mode drive-power distribution-ratio GD and the slip-mode drive-power distribution-ratio SD to the engine drive-power setting unit 68 and the motor drive-power setting unit 69. The map changeover unit 67 outputs the motor-assist-mode drive-power distribution-ratio MD when the map discrimination signal MS represents the "motor-assist-mode", and outputs the electric-power-generation-mode drive-power distribution-ratio GD when the map discrimination signal MS represents the "electric-power-generation-mode", and also outputs the slip-mode drive-power distribution-ratio SD when the map discrimination signal MS represents "the slip-mode".

Next, the engine drive-power setting unit 68 is described below in detail. The engine drive-power setting unit 68 is applied with the target drive-power TD delivered from the target drive-power setting unit 62 and is also applied with the drive-power distribution-ratio composed of either one of the motor-assist-mode drive-power distribution-ratio MD, the electric-power-generation-mode drive-power distribution-ratio GD and the slip-mode drive-power distribution-ratio SD delivered from the map changeover unit 67 to output an engine drive-power signal TED which is applied to the engine drive-power signal setting unit 70. Upon receiving the drive-power distribution-ratio and the target drive-power TD, the engine drive-power setting unit 68 calculates the engine drive power TED. In case of the electric-power-generation-mode drive-power distribution-ratio GD, the engine drive-power TED has a higher level than that achieved by the engine 3 that meets 100% of the target drive-power TD.

Next, the motor drive-power setting unit 69 is described below in detail. The motor drive-power setting unit 69 is applied with the target drive-power TD delivered from the target drive-power setting unit 62 and the drive-power distribution-ratio composed of either one of the motor-assist-mode drive-power distribution-ratio MD, the electric-power-generation-mode drive-power GD and the slip-mode drive-power distribution-ratio SD delivered from the map changeover unit 67 to output the motor drive-power TMD which is applied to the motor-demanded-torque signal setting unit 71. The motor drive-power setting unit 69 calculates the motor drive-power TMD on the basis of the drive-power distribution-ratio and the target drive-power TD. Also, upon receiving the electric-power-generation-mode drive-power distribution-ratio GD, the motor drive-power TMD has a negative potential and enables the motor 5 to serve as the electric power generator.

Next, the motor-demanded-torque signal setting unit 71. The motor-demanded-torque signal setting unit 71 is applied with the motor drive-power TMD from the motor drive-power setting unit 69 to output the motor-demanded-torque signal MT which is applied to the motor driver 15. The motor-demanded-torque signal setting unit 71 sets the RPM of the motor 5 and the rotational direction thereof on the basis of the motor drive-power TMD. Further, upon receiving data involving the RPM and the rotational direction of the motor 5, the motor-demanded-torque signal setting unit 71 sets the motor-demanded-torque signal MT that controls the motor driver 15.

Figure 6:
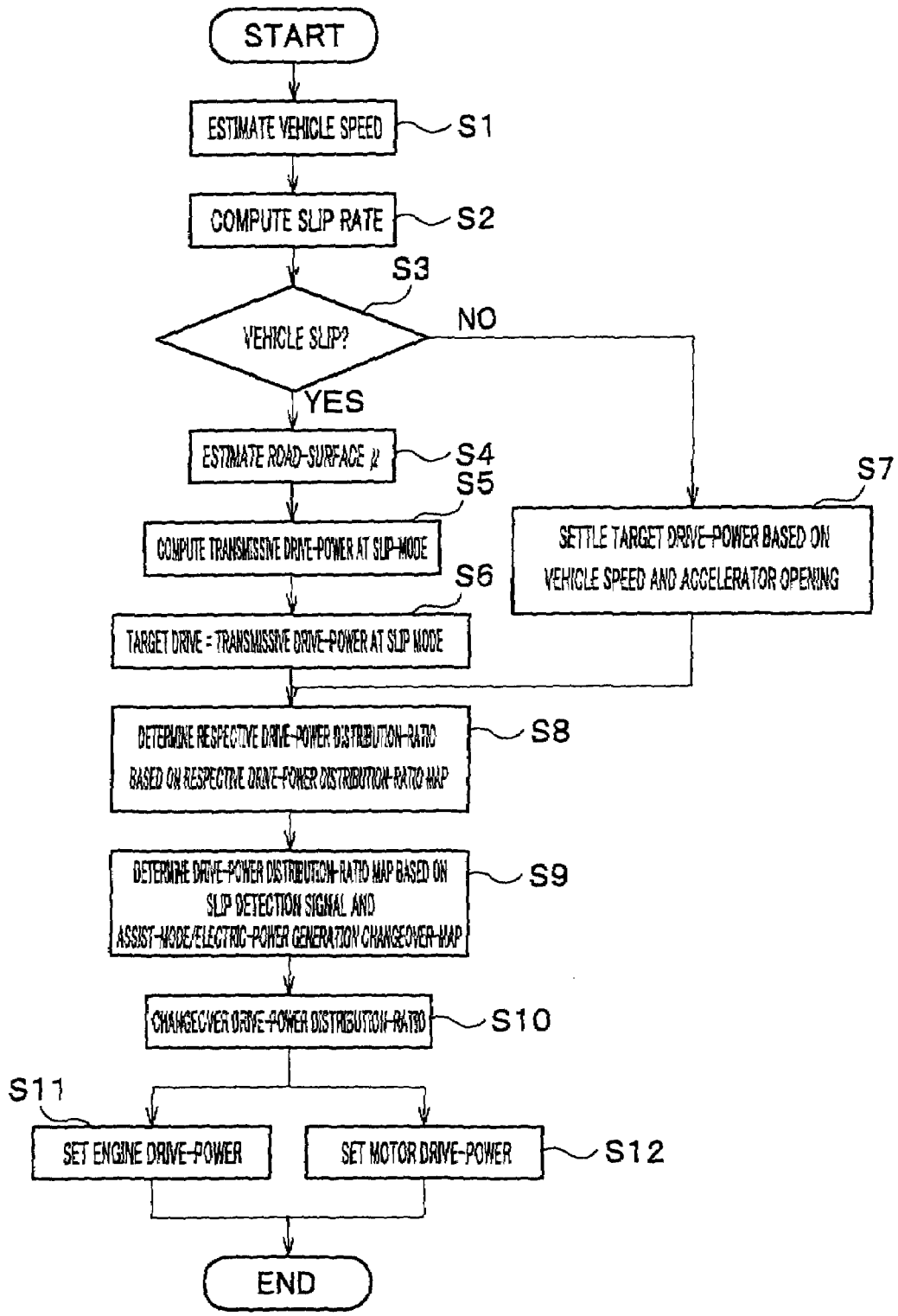
FIG. 6 is a flow diagram of the basic sequence of operational steps of the control device shown in FIG. 2.

Now, the basic sequence of operation of the control device 6 is described below in detail in conjunction with FIG. 6. FIGS. 1 to 5 are also referred to from time to time in dependence on the description.

At the start, the power supply is turned on. In this instance, the control device 6 receives the detection signals from the respective sensors 12, 13, 16, 17, 18, 23. In step S1, the vehicle-speed estimating unit 60 is responsive to the wheel RPM signal WS and the acceleration signal WA and calculates the vehicle speed BS.

In consecutive step S2, the slip detection unit 61 calculates the wheel speeds of the respective wheels 2, 2, 4, 4 on the basis of the wheel RPM signal WS, etc., and also calculates the slip rates on the basis of the calculated wheel speeds and the vehicle speed BS. In step S3, the slip detection unit 61 is responsive to the calculated slip rates and discriminates whether the vehicle 1 remains in the slipped state to produce the slip detection signal SS.

In step S4, upon receiving the slip detection signal SS of "1" (representing the slipped condition), the target drive-power setting unit 62 is responsive to the slip rates of the respective wheels 2, 2, 4, 4 and calculates the road-surface $\mu$-estimated value. In step S5, further the target drive-power setting unit 62 calculates the transmissible drive power to be used during the slipping condition on the basis of the total weight of the vehicle 1 and the road-surface $\mu$-estimated value, thereby producing the target drive-power TD that represents the transmissible drive power in step S6.

In step S7, on the contrary, upon receiving the slip detection signal of "0" (representing the non-slipping condition), the target drive-power setting unit 62 reads out the target drive-power, associated with the addresses for the vehicle speed BS and the accelerator opening signal AO, from the table to select the target drive-power TD.

In step S8, the motor-assist-mode drive-power distribution-ratio setting unit 63 is responsive to the vehicle speed BS and the target drive-power TD and selects the motor-assist-mode drive-power distribution-ratio MD from the motor-assist-mode drive-power distribution-ratio data map 63d. In step S8, also, the electric-power-generation-mode drive-power distribution-ratio setting unit 64 is responsive to the vehicle speed and the target drive-power TD and selects the electric-power-generation-mode drive-power distribution-ratio GD from the electric-power-generation-mode drive-power distribution-ratio data map 64d. In step S8, further, the slip-mode drive-power distribution-ratio setting unit 65 is responsive to the road-surface $\mu$-estimated value, the vehicle speed BS and the target drive-power TD and selects the slip-mode drive-power distribution-ratio SD from the slip-mode drive-power distribution-ratio data map.

In consecutive step S9, upon receiving the slip detection signal SS of "1", the map changeover discriminating unit 66 sets the map discrimination signal MS representing the slip-state. In contrast, upon receiving the slip detection signal SS of "0", the map changeover discriminating unit 66 calculates the amount of power SOC remaining in the battery 9 on the basis of the battery current signal BC and the battery voltage signal BV. Then, the map changeover discriminating unit 66 selects the assist-mode/electric-power-generation-mode changeover data map 66a on the basis of the amount of power SOC remaining in the battery 9. Further, the map changeover discriminating unit 66 is responsive to the selected assist-mode/electric-power-generation-mode changeover data map 66a and discriminates whether the relationship between the vehicle speed and the target drive-power TD remains in the motor-assist-mode area 66b or in the electric-power-generation-mode area 66c. In step S9, when the aforementioned relationship remain in the motor-assist-mode area 66b, the map changeover discriminating unit 66 selects the map-discrimination signal MS representing the "motor-assist-mode" and, when the aforementioned relationship remains in the electric-power-generation-mode area 66c, the map-discrimination signal MS representing "the electric-power-generation-mode" is selected.

Then, in step S10, the map changeover unit 67 functions to select the motor-assist-mode drive-power distribution-ratio MD when the map-discrimination signal MS representing "the motor-assist-mode", to select the electric-power-generation-mode drive-power distribution-ratio GD when the map-discrimination signal MS representing "the electric-power-generation-mode" and to select the slip-mode drive-power distribution-ratio SD when the map-discrimination signal MS representing "the slip-mode", thereby outputting the selected drive-power distribution ratio to the engine drive-power setting unit 68 and the motor drive-power setting unit 69.

In consecutive step S11, the engine drive-power setting unit 68 calculates the engine drive-power TED on the basis of the inputted drive-power distribution-ratios MD, GD, SD and the target drive-power TD. In step S12, further, the motor drive-power setting unit 69 calculates the motor drive-power TMD on the basis of the inputted drive-power distribution-ratios MD, GD, SD and the target drive-power TD.

Lastly, the engine drive-power signal setting unit 70 is responsive to the engine drive-power TED and produces the engine drive signal ED which is applied to the DBW driver 25. On the other hand, the motor-demanded-torque signal setting unit 71 is responsive to the motor drive-power TMD and produces the motor-demanded-torque signal MT which is outputted to the motor driver 15.

Then, the DBW driver 25 is responsive to the engine drive signal ED to adjust the opening degree of the throttle valve 26 for thereby controlling the drive power output of the engine 3. On the other hand, upon receiving the motor-demanded-torque signal MT, the motor driver 15 adjusts the RPM of the motor 5 and the rotational direction thereof. Further, the motor driver 15 is responsive to the motor-demanded-torque signal MT to control the motor 5 for thereby controlling the charging operation of the motor 5.

With such a control device 6, the presence of the motor-assist-mode drive-power distribution-ratio data map 63d formed by utilizing the aforementioned equation (1) enables the selection of the best motor-assist-mode drive-power distribution-ratio MD in the energy efficiency with respect to the relationship between the amount of fuel consumption and the amount of electric power consumption in terms of the arbitrary vehicle speed and the arbitrary target drive-power to be attained during the assist-mode of the motor 5. With such a control device 6, the presence of the electric-power-generation-mode drive-power distribution-ratio data map 64d formed by utilizing the aforementioned equation (2) enables the selection of the best electric-power-generation-mode drive-power distribution-ratio GD in the energy efficiency with respect to the relationship between the amount of fuel consumption and the amount of electric power charge in terms of the arbitrary vehicle speed and the arbitrary target drive-power to be attained during the electric-power-generation-mode of the motor 5. Another important advantage of the control device 6 involves the presence of the assist-mode/electric-power-generation-mode changeover data map 66a that enables either one of the motor-assist-mode drive-power distribution-ratio data map 63b and the electric-power-generation-mode drive-power distribution-ratio data map 64d to be selected in dependence on the amount of power SOC remaining in the battery 9, enhancing a reliability in obtaining an adequate amount of power remaining in the battery with an adjustable energy efficiency. Another important advantage of the control device 6 involves the capability of controlling the hybrid drive system such that the electric power consumption is minimized to allow the vehicle to be mounted with the battery 9 having a smaller charging amount.

It will now be appreciated from the foregoing description that the present invention is not limited to the particular illustrated embodiment discussed above and maybe carried out in various modified forms.

For example, although the motor-assist-mode drive-power distribution-ratio data map based on the aforementioned equation (1) and the electric-power-generation-mode drive-power distribution-ratio data map based on the aforementioned equation (2) have been discussed as being preliminarily set, the control device may be arranged to have a structure to compute the respective drive-power distribution-ratios by calculation with the use of the equations (1) and (2).

Further, although the respective data maps have been discussed as being set as functions of the parameters of the vehicle speed and the target drive-power, the respective data maps may be set by other parameters representing operating conditions of the vehicle.

Also, although the control device has been shown and described as having the capability of automatically changing over the drive-power distribution-ratios with three data maps, the control device may be modified so as to allow a vehicle driver to manually change over the drive power distribution ratios.

In addition, although the control device has been shown and described as having a structure wherein the slip-mode drive-power distribution-ratio SD is set with the slip-mode drive-power distribution-ratio data map during the slip-mode based on which the engine drive power and the motor drive-power are calculated, the control device may have a modified structure to enable calculation in a manner as will be discussed below. First, the vehicle speed and the target drive-power for the slip-mode are set on the basis of the transmissible drive power (the drive power transmissible between the road surface and the respective wheels) that is calculated on the basis of the total weight of the vehicle and the road-surface $\mu$-estimated value. Further, the control device is responsive to the vehicle speed and target drive-power, which are set for the slip-mode, and sets the best drive-power distribution-ratio in the energy efficiency in terms of the relationship between the amount of fuel consumption and the amount of electric power consumption. Thus, the control device may calculate the engine drive-power and the motor drive-power on the basis of such set target drive-power and relevant drive-power distribution-ratio.

An important advantage of the control device for the front and rear wheel drive vehicle of the present invention enables the distribution ratio between the engine drive-power and the motor drive-power to be set on the basis of a particular ratio between a change in the amount of fuel consumption due to the assist mode and a change in the amount of electric power consumption due to the motor drive-power, that vary during the operation of the motor, in response to the target drive-power and the vehicle speed, for thereby allowing the engine drive-power and the motor drive-power to be controlled with the aforementioned distribution ratio. As a result, it is possible for such control device to improve the energy efficiency of the hybrid drive system composed of the engine and the motor.

Another important advantage of the control device for the front and rear wheel drive vehicle involves the capability of selecting the drive power distribution ratio that maximize the quotient of "a change in an amount of fuel consumption due to the assist-mode versus the amount of electric power consumption due to the motor drive-power" with the use of the distribution ratio setting means under a condition wherein the drive power of the motor is provided in the assist-mode, thereby minimizing the electric power consumption while minimizing the fuel consumption. As a result, it is possible for such control device to improve the energy efficiency of the hybrid drive system composed of the engine and the motor.

Another important advantage of the control device for the front and rear wheel drive vehicle involves the presence of the charging-mode distribution ratio setting means that, when the motor serves as the electric power generator, enables selection of the charging-mode distribution-ratio that minimizes the quotient of "a change in the amount of fuel consumption due to electric power generating operation of the motor versus the power-charging amount of the electric storage means due to the electric power generating operation of the motor", thereby restricting an increase in the fuel consumption of the engine by the maximum limit while increasing the power charging amount due to the motor by the maximum limit. As a result, it is possible for such control device to improve the energy efficiency of the hybrid drive system composed of the engine and the motor.

What is claimed is:

1. A control device for a front and rear wheel drive vehicle having a front wheel pair and a rear wheel pair, one of which is driven with an engine and the other one of which is driven with an electric motor, comprising:
   target drive-power setting means which sets a target drive-power of said front and rear wheel drive vehicle on the basis of operating conditions thereof,
   wherein the control device controls an engine drive-power and a motor drive-power on the basis of a distribution ratio, which is set in consideration of the target drive-power, a vehicle speed, and a ratio between a change in an amount of fuel consumption and a change in an amount of electric power consumption during an operation of the electric motor.

2. The control device for the front and rear wheel drive vehicle according to claim 1, further comprising:
   distribution-ratio setting means which calculates $$(EF-AF)/PU$$

where
   EF=the amount of fuel consumption attained when the target drive-power is achieved with the engine drive-power;
   AF=the amount of fuel consumption which is predicted when the motor drive-power is added to the engine drive-power to achieve the target drive-power; and
   PU=the amount of electric power consumption when the motor drive-power is added, on the basis of the target drive-power and the vehicle speed, and sets a drive-power distribution ratio between the engine drive-power and the motor drive-power in accordance with the calculated value,
      wherein the control device controls the engine drive power and the motor drive power on the basis of the drive-power distribution ratio set by the distribution-ratio setting means.

3. The control device for the front and rear wheel drive vehicle according to claim 2, wherein said distribution-ratio setting means sets the drive-power distribution ratio such that the calculated value takes the maximum value.

4. The control device for the front and rear wheel drive vehicle according to claim 1, further comprising:
   electric storage means adapted to be charged by an electric power generating operation of said electric motor; and
   charging-mode distribution-ratio setting means which calculates $$(GF-EF)/PC$$

Where
   EF=the amount of fuel consumption attained when the target drive-power is achieved with the engine drive-power;
   GF=the amount of fuel consumption which is predicted when the target drive-power is achieved while an electric power output is generated by the electric motor; and
   PC=the amount of electric power charge when the electric power output is generated by the electric motor, on the basis of the target drive-power and the vehicle speed, and sets a charging-mode distribution ratio between the engine drive-power and the motor drive-power in accordance with the calculated value, wherein the control device controls the engine drive power and the motor drive power on the basis of the charging-mode distribution ratio set by the charging-mode distribution-ratio setting means.

5. The control device for the front and rear wheel drive vehicle according to claim 4, wherein said charging-mode distribution-ratio setting means sets the charging-mode distribution ratio such that the calculated value takes the minimum value.

6. A control device for a front and rear wheel drive vehicle having a front wheel pair and a rear wheel pair, one of which is driven with an engine and the other one of which is driven with an electric motor, comprising:

sensor means for producing detection signals representative of operating conditions of said front and rear wheel drive vehicle;

target drive-power setting means for setting a target drive-power of said front and rear wheel drive vehicle in response to said detection signals;

engine drive-power setting means for setting an engine drive-power in response to said target drive-power; and motor drive-power setting means for setting a motor drive-power in response to said target drive-power, wherein the control device controls the engine drive-power and the motor drive-power on the basis of a distribution ratio, which is set in consideration of the target drive-power, a vehicle speed, and a ratio between a change in an amount of fuel consumption and a change in an amount of electric power consumption during an operation of the electric motor.

7. The control device for the front and rear wheel drive vehicle according to claim 6, wherein said target drive-power setting means includes:

a target drive-power setting unit for producing a target drive-power in response to said detection signals;

a motor-assist-mode drive-power distribution-ratio setting unit for producing a motor-assist-mode drive-power distribution-ratio in response to said detection signals; and an electric-power-generation-mode drive-power distribution-ratio setting unit for producing an electric-power-generation-mode drive-power distribution-ratio in response to said detection signals, wherein said engine drive-power setting means and said motor drive-power setting means are operative to control said engine and said electric motor in response to the target drive-power, the motor-assist-mode drive-power distribution-ratio, and the electric-power-generation-mode drive-power distribution-ratio.

8. A front and rear wheel drive vehicle having a front wheel pair and a rear wheel pair comprising:

an engine drivably coupled to one of said front and rear wheel pairs;

an electric motor drivably coupled to the other one of said front and rear wheel pairs;

sensor means for producing detection signals representative of operating conditions of said front and rear wheel drive vehicle;

target drive-power setting means for setting a target drive-power of said front and rear wheel drive vehicle in response to said detection signals;

engine drive-power setting means for setting an engine drive-power in response to said target drive-power; and motor drive-power setting means for setting a motor drive-power in response to said target drive-power, wherein the engine drive-power and the motor drive-power are controlled on the basis of a distribution ratio, which is set in consideration of the target drive-power, a vehicle speed, and a ratio between a change in an amount of fuel consumption and a change in an amount of electric power consumption during an operation of the electric motor.

* * * * *